(12) United States Patent
Tan

(10) Patent No.: US 8,348,696 B2
(45) Date of Patent: Jan. 8, 2013

(54) ELECTRICAL CONNECTOR WITH LIGHT PIPE

(75) Inventor: Chin Guan Tan, Singapore (SG)

(73) Assignee: Molex Incorporated, Lisle, IL (US)

( * ) Notice: Subject to any disclaimer, the term of this patent is extended or adjusted under 35 U.S.C. 154(b) by 243 days.

(21) Appl. No.: 12/842,519

(22) Filed: Jul. 23, 2010

(65) Prior Publication Data

US 2011/0021045 A1    Jan. 27, 2011

(30) Foreign Application Priority Data

Jul. 24, 2009  (SG) .................................. 200904994
Jul. 24, 2009  (SG) .................................. 200904995

(51) Int. Cl.
*H01R 3/00* (2006.01)
(52) U.S. Cl. ........................................................ 439/490
(58) Field of Classification Search ........................ None
See application file for complete search history.

(56) References Cited

U.S. PATENT DOCUMENTS

| | | | | |
|---|---|---|---|---|
| 5,876,239 A * | 3/1999 | Morin et al. .................. 439/490 |
| 6,574,414 B2 * | 6/2003 | Schechtel et al. ............. 385/146 |
| 6,623,292 B1 * | 9/2003 | Holler et al. .................. 439/490 |
| 7,175,327 B1 * | 2/2007 | Tsai ............................... 362/555 |
| 7,249,966 B2 * | 7/2007 | Long .......................... 439/541.5 |
| 7,494,365 B2 * | 2/2009 | Gange ........................... 439/490 |

* cited by examiner

*Primary Examiner* — Vanessa Girardi
(74) *Attorney, Agent, or Firm* — Stephen L. Sheldon

(57) ABSTRACT

An electrical connector comprises a housing and one or more light pipes. The housing includes oppositely disposed first and second end portions and is configured for electrically and mechanically connecting a circuit board adjacent a status indicator. Light pipes can be supported adjacent to the respective first and second end portions and may be disposed proximate to the status indicators. Each light pipe includes an elongated main body configured to optically couple with the status indicator and to guide light emitted from the status indicator, a supporting member disposed on the main body and configured to engage the first end portion and a clip member disposed on the main body and configured to engage the first end of the housing, the supporting member and the clip member helping support and secure the main body.

19 Claims, 18 Drawing Sheets

US 8,348,696 B2

ELECTRICAL CONNECTOR WITH LIGHT PIPE

RELATED APPLICATIONS

This application claims priority to Singapore Application No. 200904994-1, filed Jul. 24, 2009, and to Singapore Application No. 200904995-8, filed Jul. 24, 2009, both of which are incorporated herein by reference in their entirety.

FIELD OF THE INVENTION

The present invention relates to an electrical connector, and more particularly, to an electrical connector with a light pipe.

BACKGROUND ART

In computing systems, electrical connectors such as dual in-line memory module (DIMM) sockets generally are provided and mounted on motherboards in order to electrically and mechanically connect extension boards such as interface boards for peripheral devices or memory boards. Occasionally, light emitters are provided adjacent to the electrical connectors to visually indicate when the extension boards received within the electrical connectors fail. However, due to the tightly-packed design of many motherboards, the light emitters sometimes have to be disposed proximately to or even below the electrical connectors, and consequently the light emitters are obstructed from view by opaque electrical connectors.

Certain electrical connectors use clear plastic ejector levers, which function as light pipes to allow technicians to visually inspect activation of light emitters next to the electrical connectors when there are failures of received extension boards. However, due to higher processing temperatures required by the use of lead-free solder with higher melting points, the clear plastic ejector levers can deform and fail to stand up well.

U.S. Pat. No. 7,494,365 to Gange, et al. discloses a connector ejector lever with a light pipe. The ejector lever is mounted in pivoting manner to at least one of the first and second ends and is configured with an aperture therethrough with a light pipe extending through the aperture for alignment with a fault indicator. Usually, ejector levers are fixed in one position after extension boards are inserted. The ejector levers can be freely moved over a perceivable range, and therefore, the ejector levers may not be aligned with fault indicators after extension boards are inserted. The light pipe rotates with the ejector lever so that the light pipe is not always aligned with the fault indicator.

Moreover, the above-mentioned light guiding techniques are only applicable for standard DIMM sockets, which receive shorter memory boards. In a computing system using tall DIMM sockets, ejector levers are often deeply buried among tall memory boards and technicians cannot easily observe the light emitted from fault indicators through the ejector levers built according to the above-mentioned light guiding techniques. Usually, the ejection mechanism of a tall DIMM socket is designed differently from that of a standard DIMM socket for access purposes. As such, the ejector lever of a tall DIMM socket cannot be seen externally, and therefore it is impossible to see light emitting through the ejector levers manufactured according to the above-mentioned light guiding techniques. Thus, certain individuals would appreciate and improved electrical connector.

SUMMARY OF THE INVENTION

An electrical connector is disclosed and includes a housing and a light pipe. The housing includes oppositely disposed first and second end portions and is configured for electrically and mechanically connecting a circuit board, wherein the status indicator is proximate to the first end portion. The light pipe includes an elongated main body, a supporting member, and a clip member. The main body is configured to optically couple with a status indicator provided on a circuit board and helps guide light emitted from the status indicator. The supporting member is disposed on the main body and is configured to be placed on the top of the first end portion to support the main body adjacent to the first end portion. The clip member is disposed on the main body and is configured to engage with the first end portion to secure the main body.

BRIEF DESCRIPTION OF THE DRAWINGS

The disclosure provided herein will be described according to the appended drawings in which.

DETAILED DESCRIPTION OF THE INVENTION

The depicted embodiments allow for the provision of an electrical connector with a light pipe that tends to not be affected by higher soldering temperatures associated with lead-free soldering and can direct the light emitted from the status indicator disposed adjacent to or below a tall DIMM socket. For example, certain depicted embodiments provide an electrical connector with a pair of light pipes. The light pipes are disposed vertically and adjacent to the corresponding end portions of the housing of the electrical connector such that the light emitted from the status indicators disposed adjacent to or below the electrical connectors can be easily seen through the light pipe. Each light pipe can include a supporting member and a clip member. Using the supporting member, each light pipe can be supported by the top of the respective end portion of the housing, and with the clip member, each light pipe can be engaged with the respective end and firmly held. With the help of the light pipe, status indicators positioned amongst tall DIMMs can be conveniently observed and any requirement for a high soldering temperature will tend to not influence the visibility of the status indicators.

Figure 1:
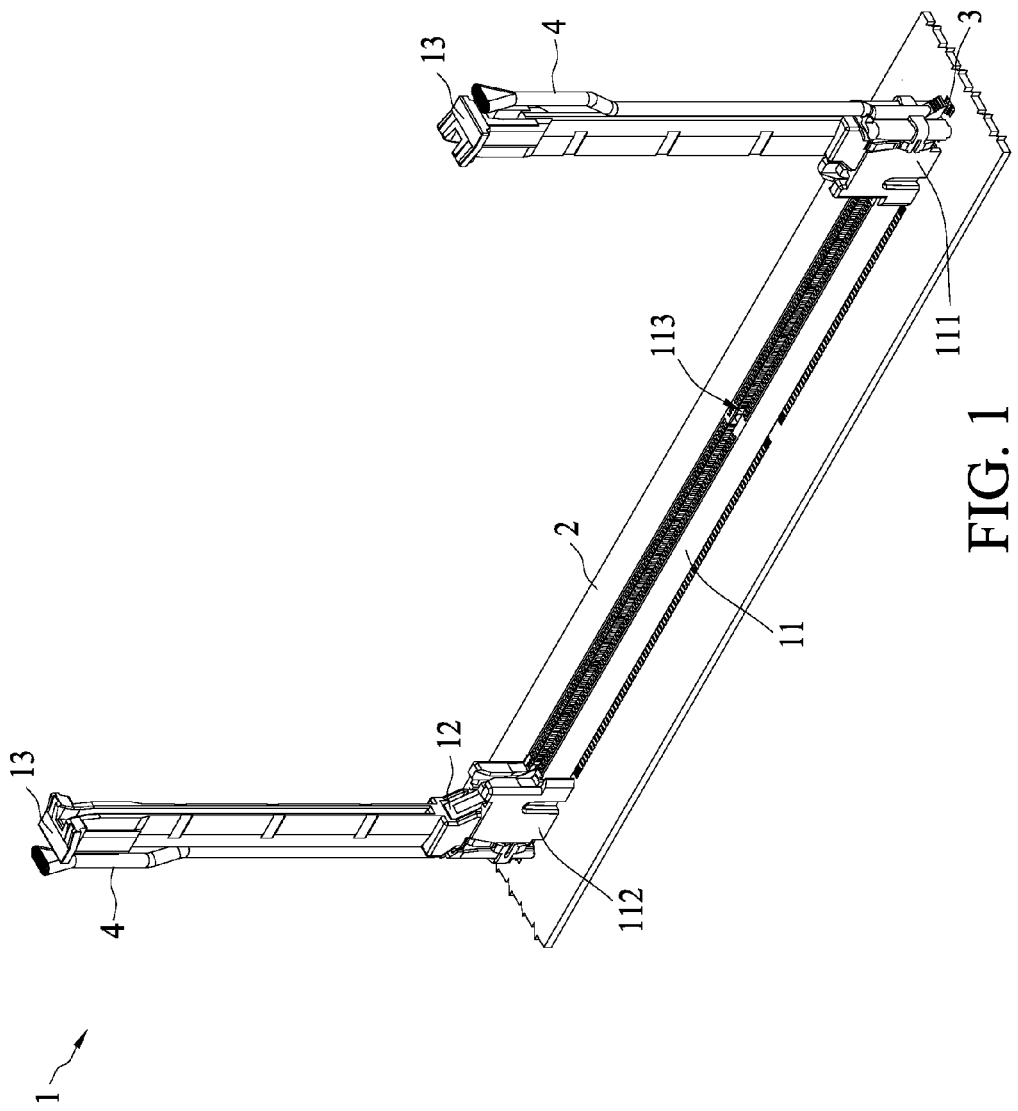
FIG. 1 is a perspective view of an embodiment of an electrical connector.
Figure 2:
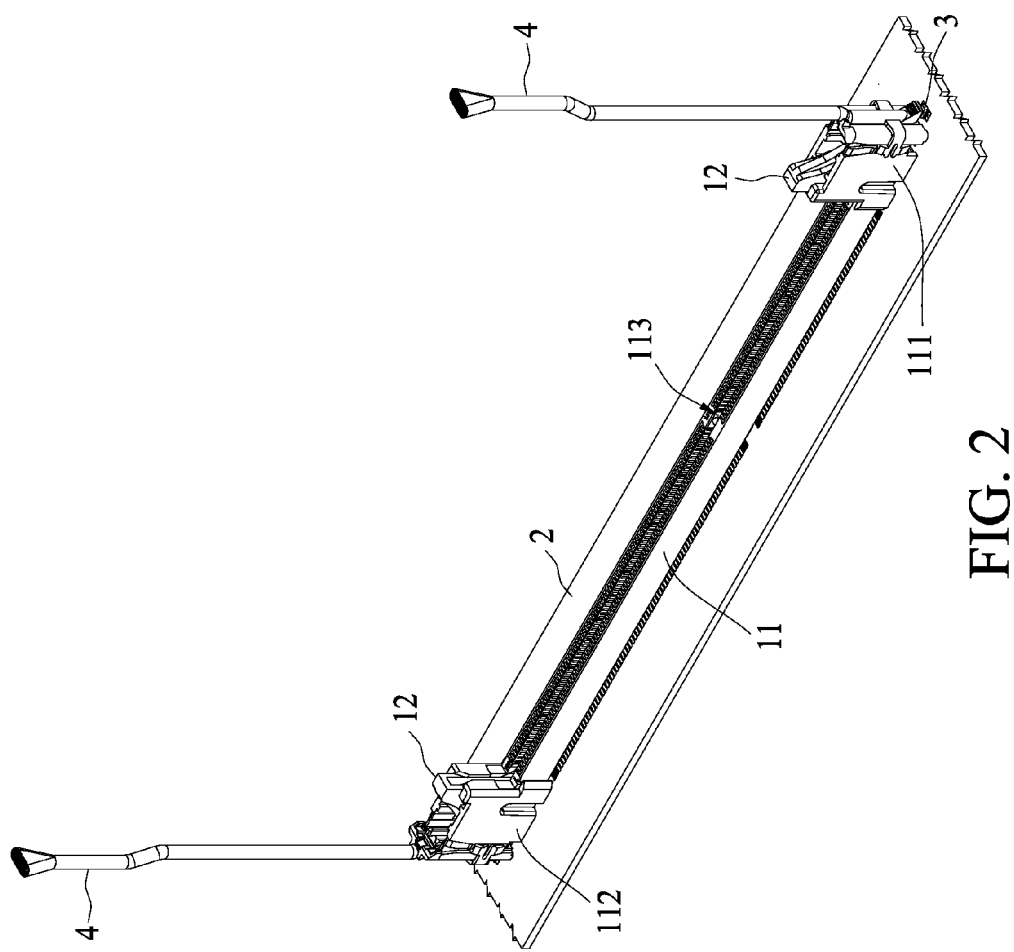
FIG. 2 is a perspective view of a simplified version of the electrical connector depicted in FIG. 1.

As illustrated in FIGS. 1 and 2, the electrical connector 1 can be mounted on a printed circuit board 2 with two status indicators 3 disposed proximate to the ends of the two oppositely disposed first end portion 111 and second end portions 112 of the housing 11. The housing 11 includes a board-receiving slot 113 facing upward to receive a circuit board (not shown), which is erected relative to the printed circuit board 2. Within each of the first end portion 111 and the second end portions 112, a combined latch-ejector unit 12, which is mounted in a pivoting manner and is configured to latch and eject a received circuit board (not shown), is provided. The electrical connector 1 of the present embodiment is configured to receive a tall DIMM (not shown) so that a pair of tall actuators 13 configured to rotate the respective combined latch-ejector units 12 to eject a received circuit board are provided and are supportably mounted at the respective first and second end portions 111 and 112.

Figure 3:
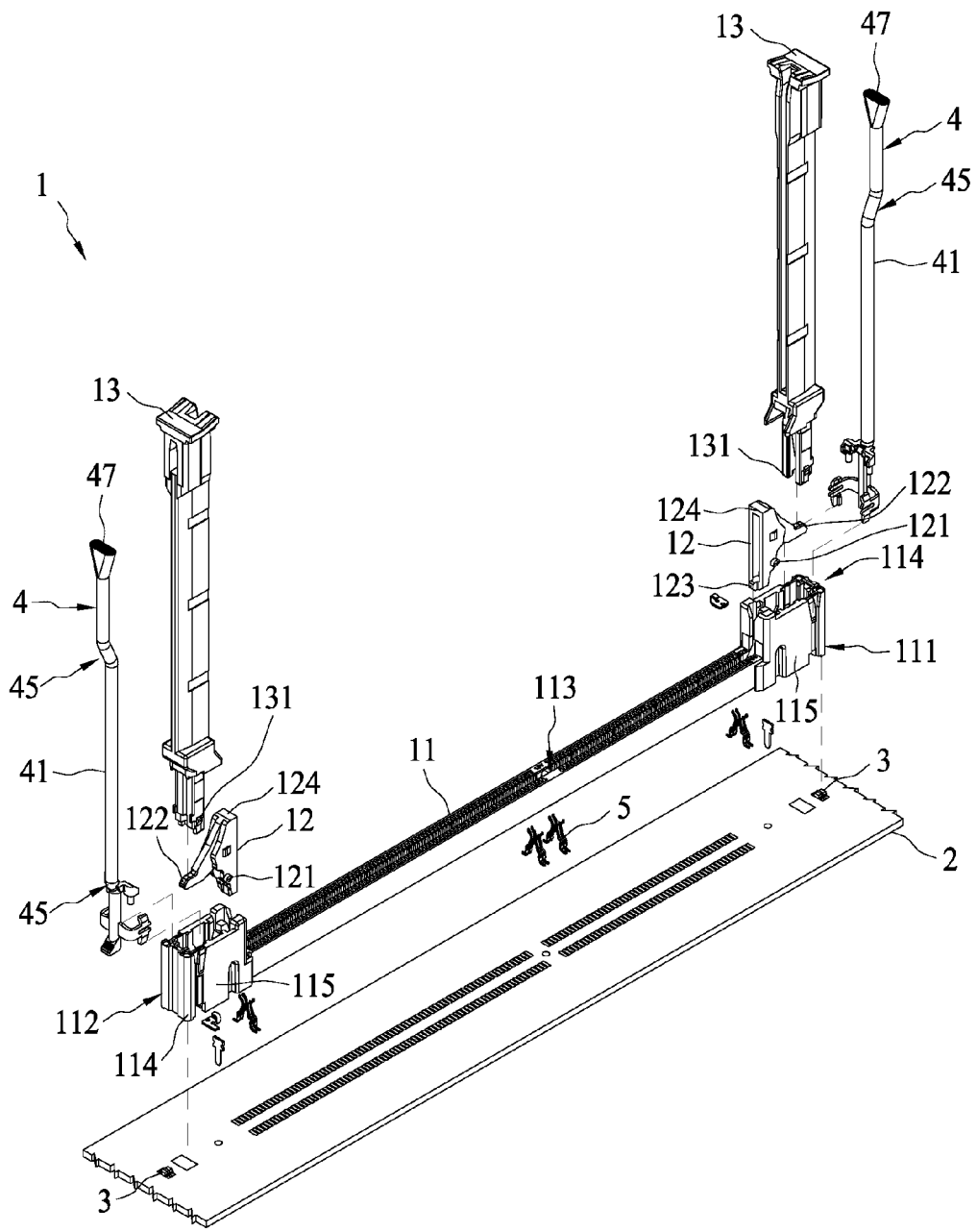
FIG. 3 is an exploded perspective view of FIG. 1.

Specifically, as shown in FIG. 3, a plurality of terminals 5 are internally arrayed around the board-receiving slot 113 and arranged to electrically and mechanically engage a circuit board received in the board-receiving slot 113. Each of the first end portion 111 and the second end portions 112 is circumferentially defined by an end wall 114 and two side walls 115, and therewithin, the respective combined latch-ejector units 12 are received. Each combined latch-ejector unit 12 includes a pair of pivots 121 disposed on the respective side surfaces thereof so that each combined latch-ejector unit 12 can move in a pivoting manner. Each combined latch-ejector unit 12 further includes a levering portion 122 engageable with the bottom portion 131 of the respective actuator 13. The bottom portion 131 pushes the respective levering portion 122 to rotate the combined latch-ejector unit 12 when a force for ejecting a received circuit board is applied on the actuator 13. The ejector 123 of the rotated combined latch-ejector unit 12 pushes the received edge of the received circuit board so as to eject the received circuit board. Each combined latch-ejector unit 12 moreover includes a latch 124 for locking an inserted circuit board in order to prevent the inserted circuit board from being accidentally pulled out.

Referring to FIGS. 2 and 3 again, due to the tallness of the actuator 13, the status indicators 3 adjacent to the electrical connector 1 are not easily seen, and the height of the combined latch-ejector unit 12 is not tall enough, compared to the height of the actuator 13, to allow the light emitted from the status indicators 3 to be easily observed by technicians. In addition, each combined latch-ejector unit 12 is placed below the respective actuators 13 such that the combined latch-ejector unit 12 is hidden from view, and therefore the combined latch-ejector unit 12 cannot be used as a light pipe. In order to allow the emitted light to be visible to technicians, a pair of light pipes 4 is provided. Two light pipes 4 are disposed adjacent to the respective first and second end portions 111 and 112 and are erected adjacent to and along the respective actuators 13. Each light pipe 4 is configured to optically couple with the respective status indicators 3 so that the light emitted from the status indicators 3 can pass through the light pipe 4 to a location close to the distal end of the actuator 13. As such, the light of the status indicators 3 can be easily seen by technicians. The status indicators 3 may be light emitting diode (LED) indicators. Each status indicator 3 is configured to indicate the status of the circuit board in close proximity thereto. For example, when a fault of a received printed circuit board is detected, the status indicator 3 is activated (e.g., turned on) to alert the technician.

Figure 4:
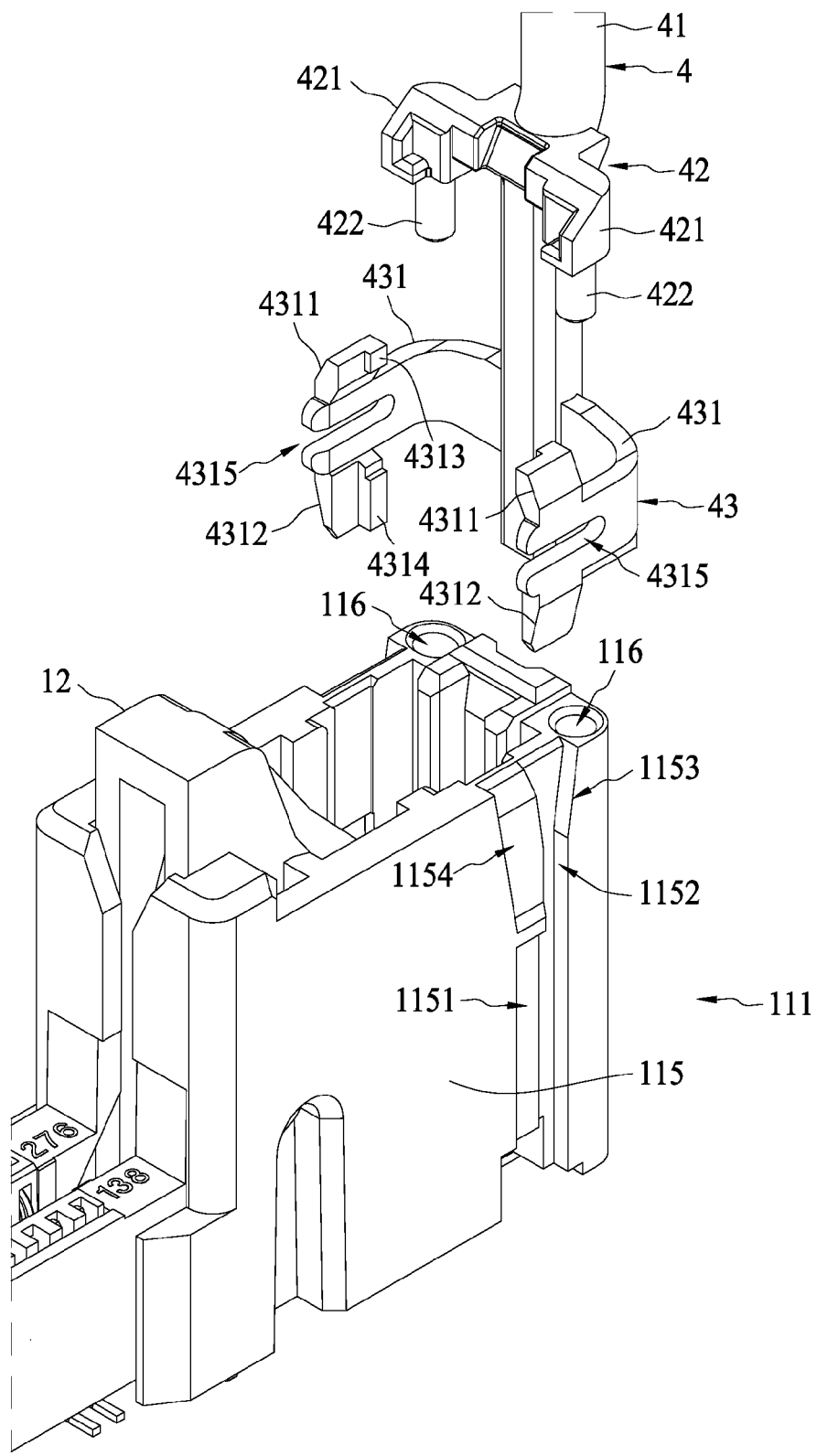
FIG. 4 is an enlarged perspective view of an embodiment of a supporting member and a clip member of a separating light pipe and an end portion.
Figure 5:
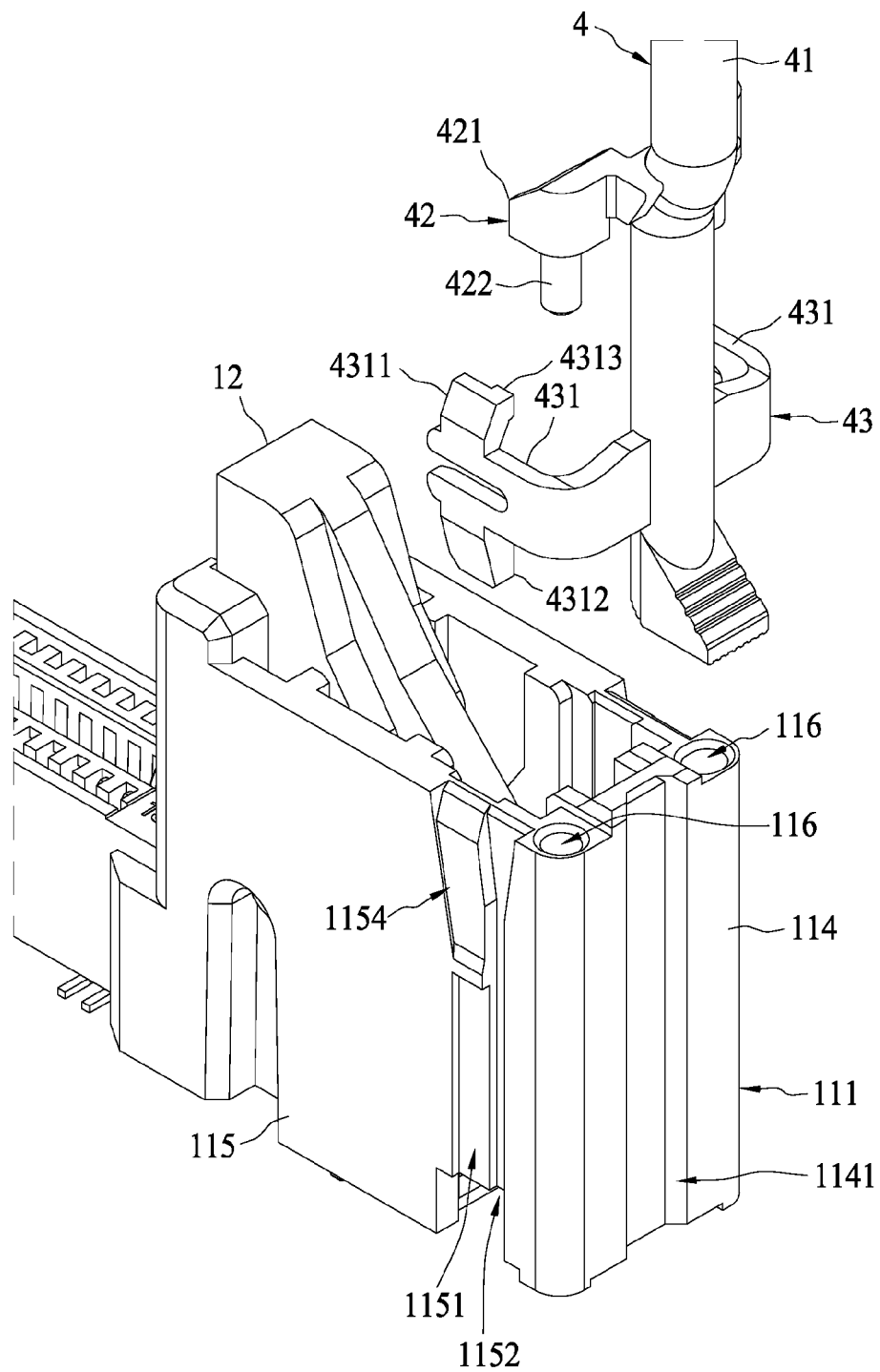
FIG. 5 is another enlarged perspective view of the supporting member and the clip member depicted in FIG. 4.
Figure 6:
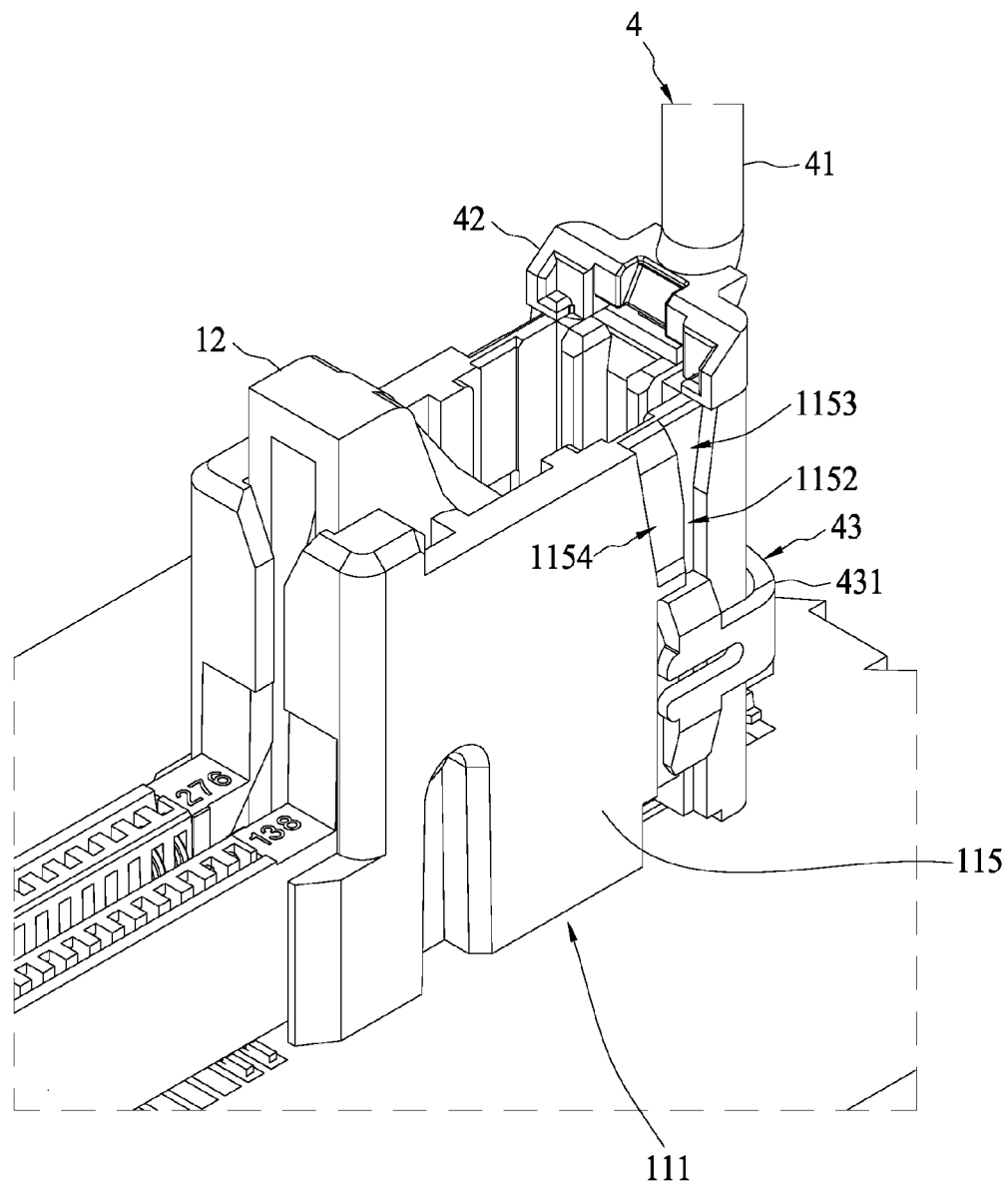
FIG. 6 is an enlarged perspective view of embodiment depicted in FIG. 4 with the light pipe mounted to the end portion.
Figure 7:
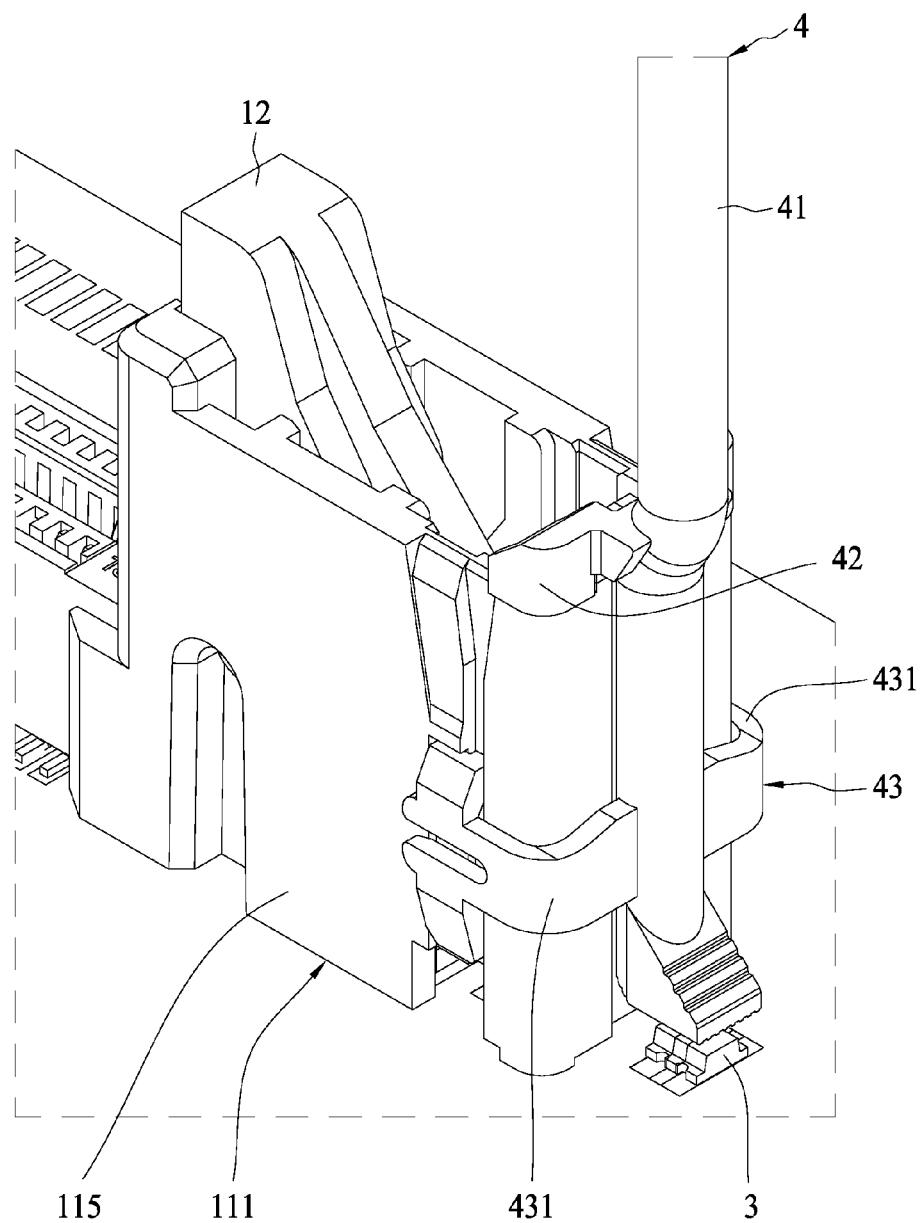
FIG. 7 is another enlarged perspective view of the embodiment depicted in FIG. 6.

Referring to FIGS. 4, 5, 6 and 7, in this exemplary embodiment, the detailed descriptions are focused on the first end portion 111; however, if the light pipe is provided on two ends then the same descriptions are also applicable to the second end portions 112 as shown in FIG. 3. The depicted light pipe 4 comprises an elongated main body 41, a supporting member 42, and a clip member 43. The main body 41 is configured to optically couple with a status indicator 3 for guiding light, emitting from the status indicators 3, from one end of the main body 41 to another. The main body 41 is supportably erected adjacent to the first end portion 111. The main body 41 is provided with a supporting member 42 so that after the main body 41 is placed on the top of the first end portion 111, the first end portion 111 can support the light pipe 4 through the supporting member 42 as shown in FIGS. 6 and 7.

Referring to FIG. 4, the supporting member 42 may include a pair of supporting arms 421, which as depicted extend horizontally outward away from one another. Each of the supporting arms 421 has a downwardly projected pin 422 disposed adjacent a distal end of each supporting arm 421. As depicted, the pin 422 is circular in shape but could be other shapes as desired and appropriate. On the top of the first end portion 111 where the supporting arms 421 are placed, a recess 116 is provided that receives the pin 422 when the supporting member 42 is mounted on the housing. In an embodiment, the provision of the pins 422 and the recess 116 can allow the light pipe 4 to be properly positioned relative to the first end portion 111 after installation. It should be noted that while the use of two pins 116 adds some additional stability, in certain embodiments a single pin 422 supported by a single support arm 421 could be sufficient. Referring to FIGS. 4, 5, 6 and 7 again, the clip member 43 may include a pair of locking portions 431, which extend oppositely and laterally from the main body 41 and are adapted to be around the peripheral outline of the first end portion 111 so that the distal ends of the locking portions 431 can engage with the respective side walls 115. Adjacent to the distal end of each locking portion 431, a locking part 4311 and a protruding part 4312 are laterally and oppositely disposed. According to the present embodiment, the protruding part 4312 is disposed below the locking part 4311. Each locking part 4311 includes a locating rib 4313, which projects inward from the surface, proximate to the first end portion 111 when the light pipe 4 is installed, and the protruding part 4312 also includes a locating rib 4314, which projects inward from the surface, adjacent to the first end portion 111 when the light pipe 4 is installed. Both the locating ribs 4313 and 4314 are aligned along a vertical direction.

Figure 8:
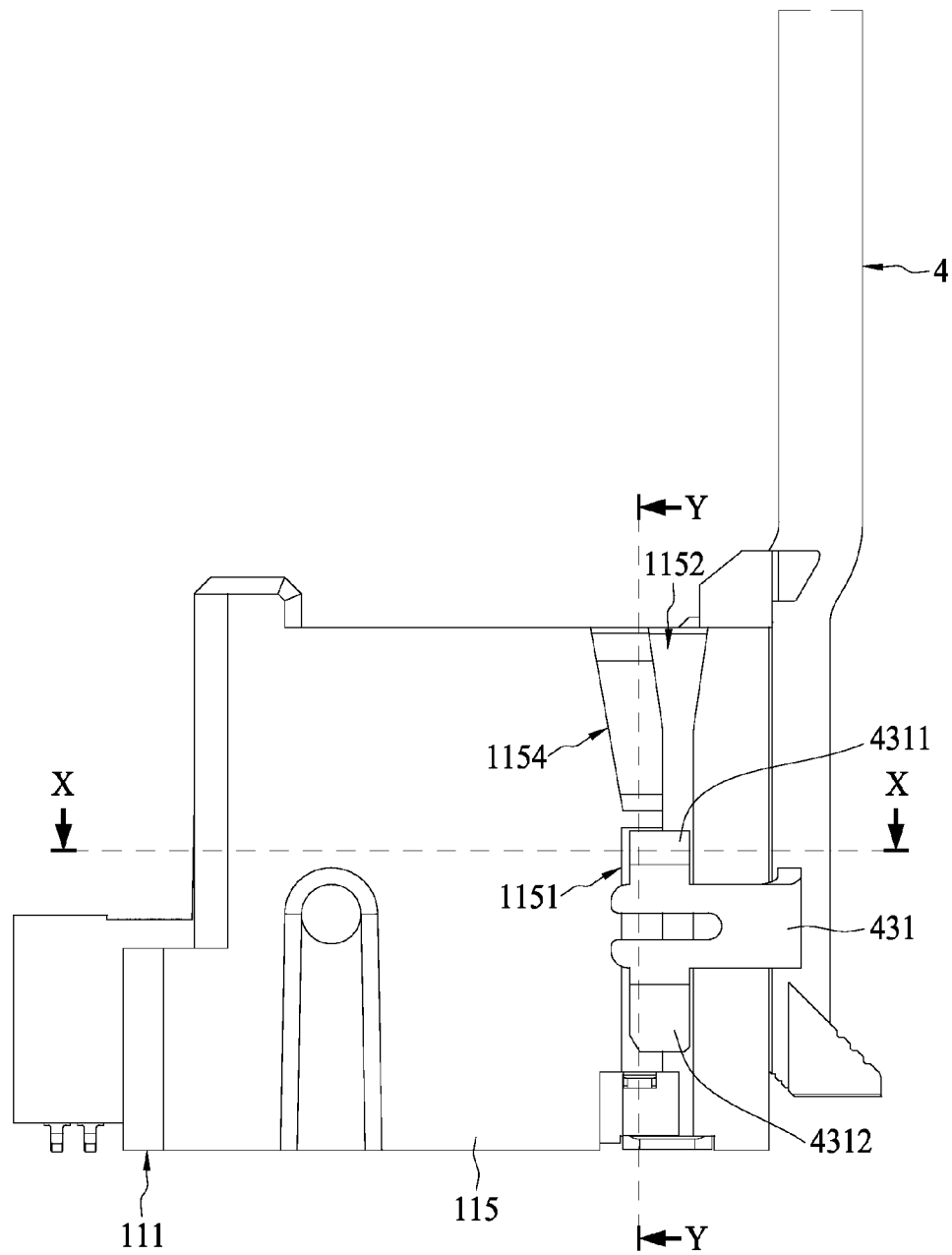
FIG. 8 is a side view of FIG. 7.
Figure 9:
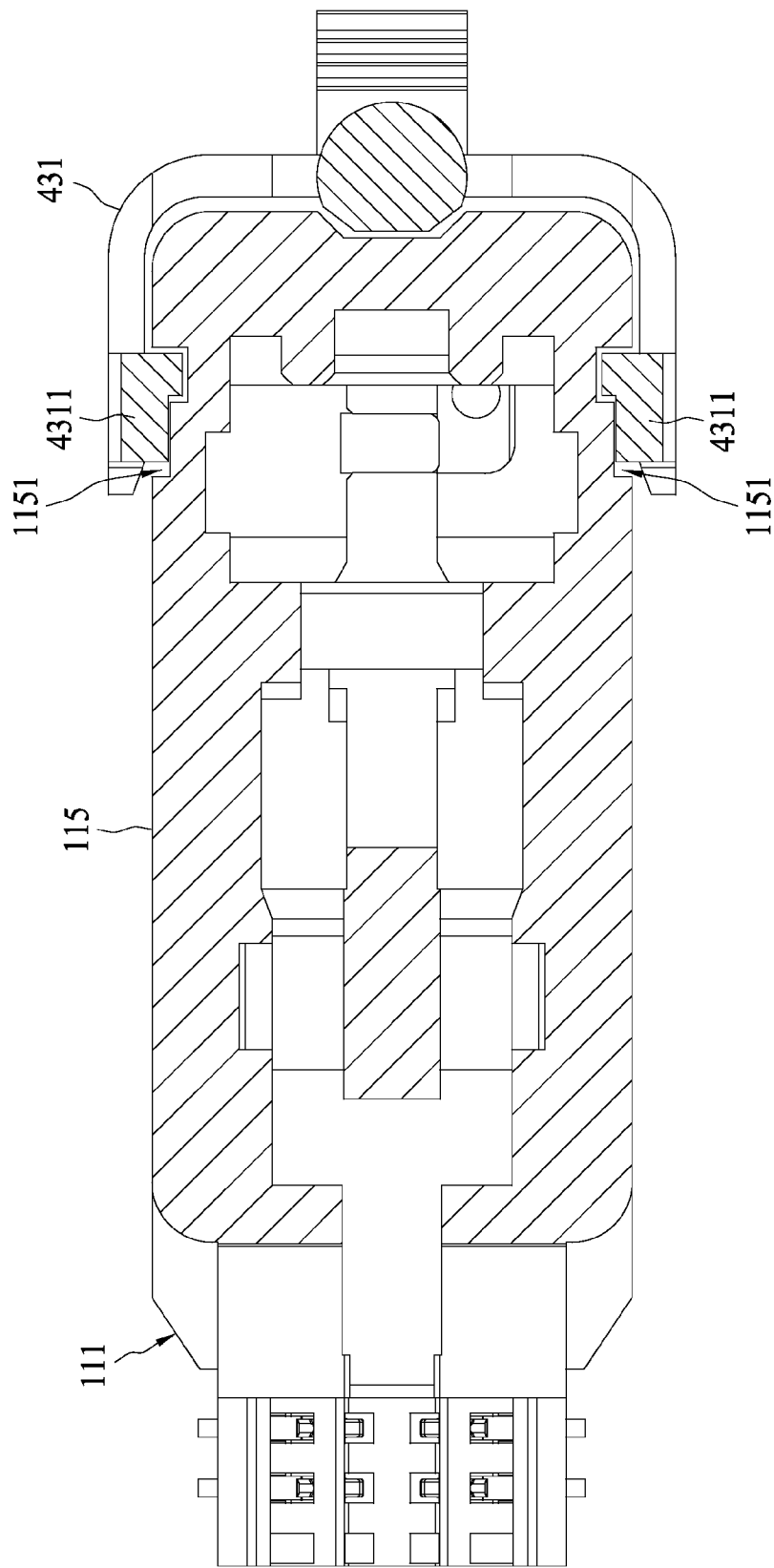
FIG. 9 is a cross sectional view along the line X-X of FIG. 8.
Figure 10:
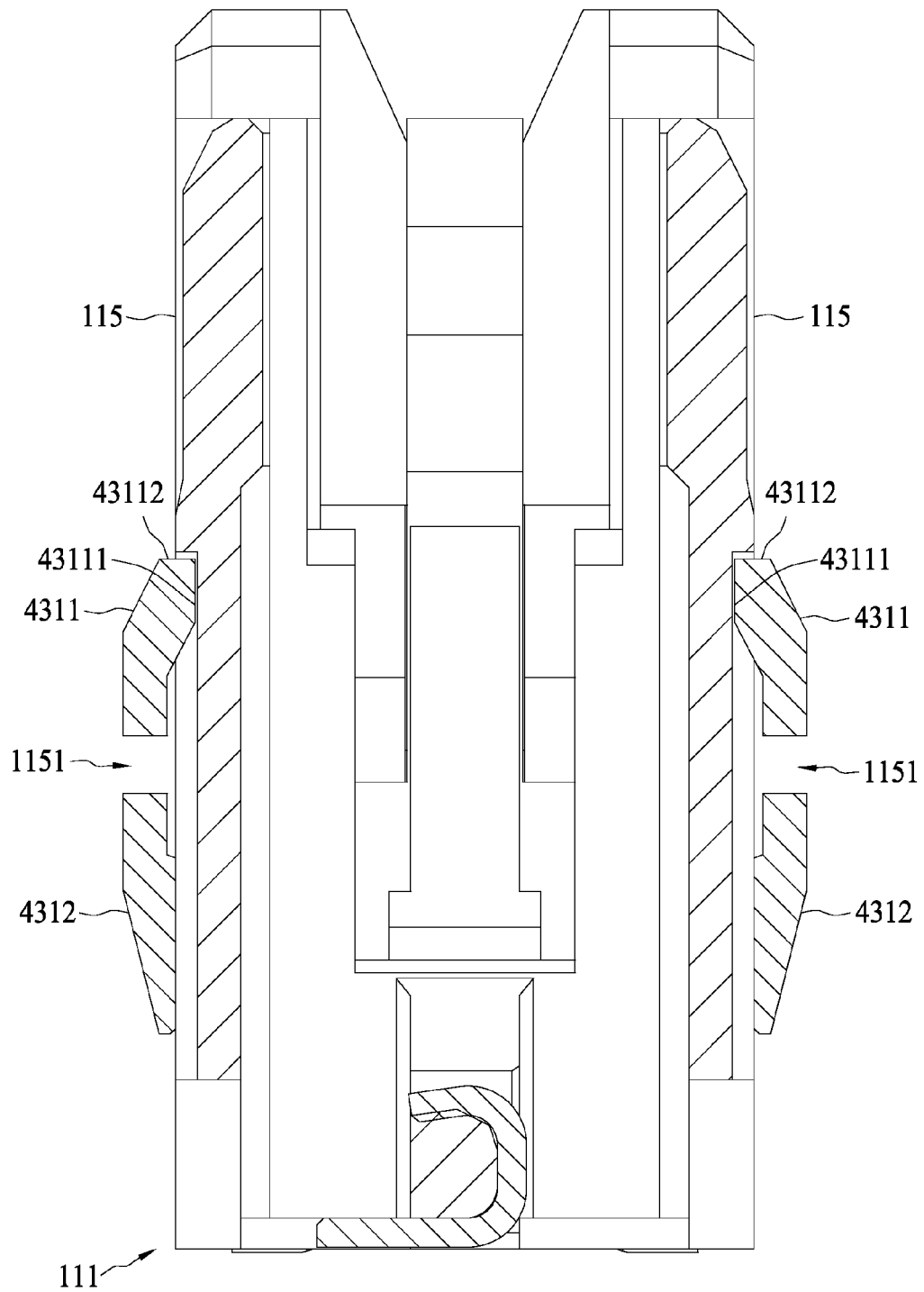
FIG. 10 is a cross sectional view along the line Y-Y of FIG. 8.

Correspondingly, each side wall 115 has an indented section 1151 formed on the surface of the side wall 115, with a size adapted to receive the respective locking part 4311 as shown in FIG. 6. More specifically, as illustrated in FIG. 10, the inner side 43111 of each locking part 4311 is adapted to project inward such that the inner side 43111 of each locking part 4311 is received within the indented section 1151 and a portion of the upper edge 43112 of the locking part 4311 can engage the corresponding upper edge defining the indented section 1151 to prevent the light pipe 4 from being pulled out. Consequentially, the light pipe has a support arm that engages a first surface of the housing and the clip engages a second and third surface of the housing so as to help secure the Referring to FIGS. 8, 9, and 10, during the installation of the light pipe 4, paired locking portions 431 are slightly pushed away or deformed while the inner sides 43111 of the locking parts 4311 engage the respective side walls 115. After the locking parts 4311 engage the respective indented sections 1151, the deformation of the locking portions 431 is corrected, and the inner sides 43111 of the locking parts 4311 reside within the respective indented sections 1151 such that each locking part 4311 is restrained by the edges defining the respective indented section 1151 as shown in FIGS. 9 and 10. Consequently, the light pipe 4 cannot be pulled out along or moved orthogonal to the insertion direction.

Referring to FIG. 4, a groove 1152 configured for guiding the respective locating ribs 4313 and 4314 is formed on each side wall 115 and is disposed with respect to the corresponding locating ribs 4313. The groove 1152 can be along a side edge of the indented section 1151. The groove 1152 may have a lead-in part 1153 for directing the locating ribs 4313 and 4314 into the groove 1152.

Referring to FIG. 4 again, on the insertion path of the protruding part 4312 and the locking part 4311, another indented section 1154 having a surface tapered from the top of the first end portion 111 toward the indented section 1151 can be provided to facilitate the insertion. As such, the locking portions 431 may elastically deform and be guided by the indented section 1154 during insertion when the locking part 4311 is passing the indented section 1154, and insertion force can be reduced accordingly.

Furthermore, a slit 4315 can be formed on the distal end of each locking portion 431 such that the locking part 4311 and the protruding part 4312 can move more flexibly and independently.

Figure 11:
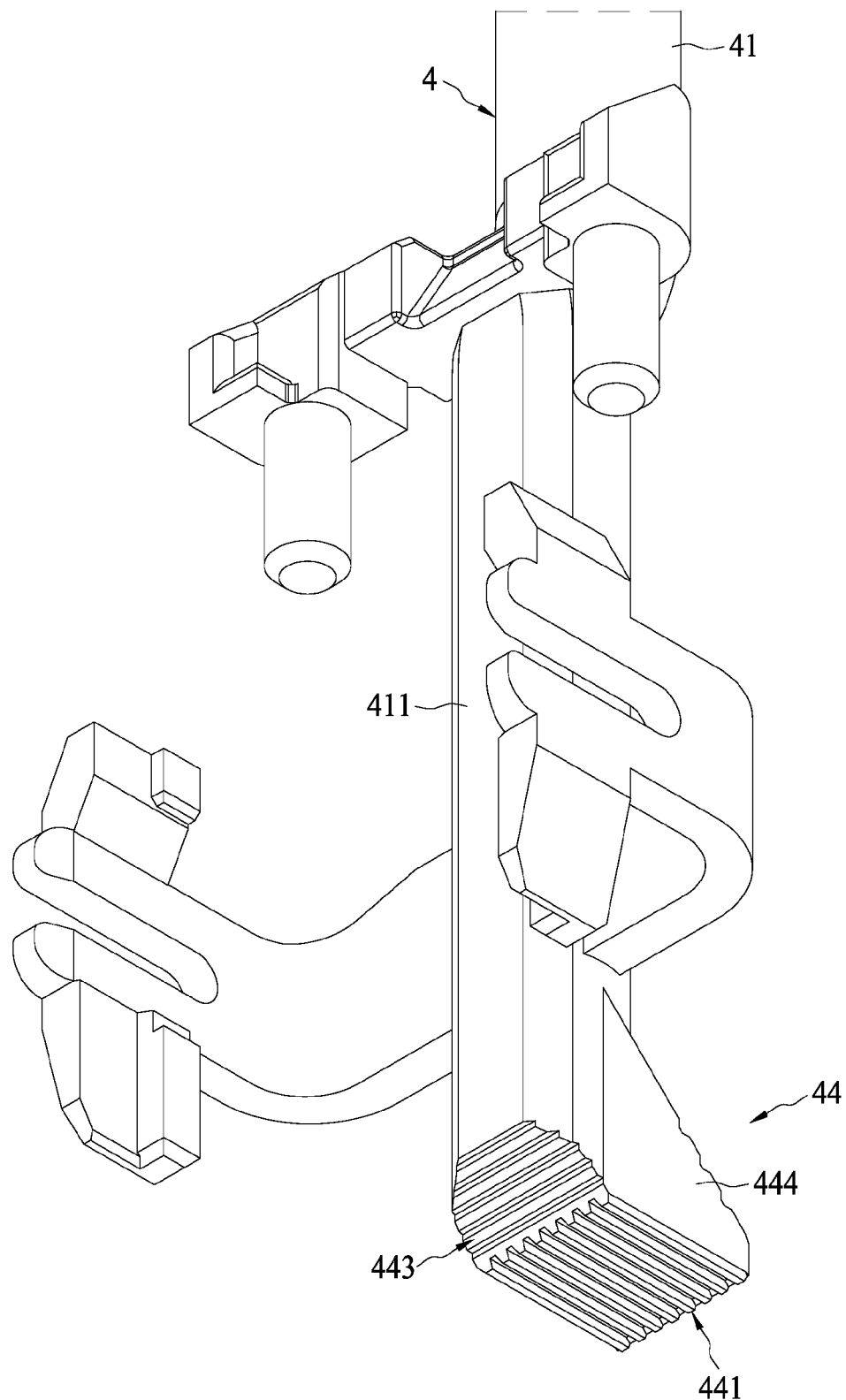
FIG. 11 is a partial perspective view of an embodiment of a light pipe.

Moreover, referring to FIGS. 5 and 11, on the end wall 114 of the first end portion 111, a vertically straight groove 1141 is formed for receiving the main body 41 of a light pipe 4 and having a cross sectional contour mated with the cross sectional shape of the received portion 411 of the main body 41 such that when the light pipe 4 is installed, the main body can be partially held by the first end portion 111. As shown in FIG. 11, in the present embodiment, the received portion 411 has a polygonal cross-sectional shape.

Figure 12:
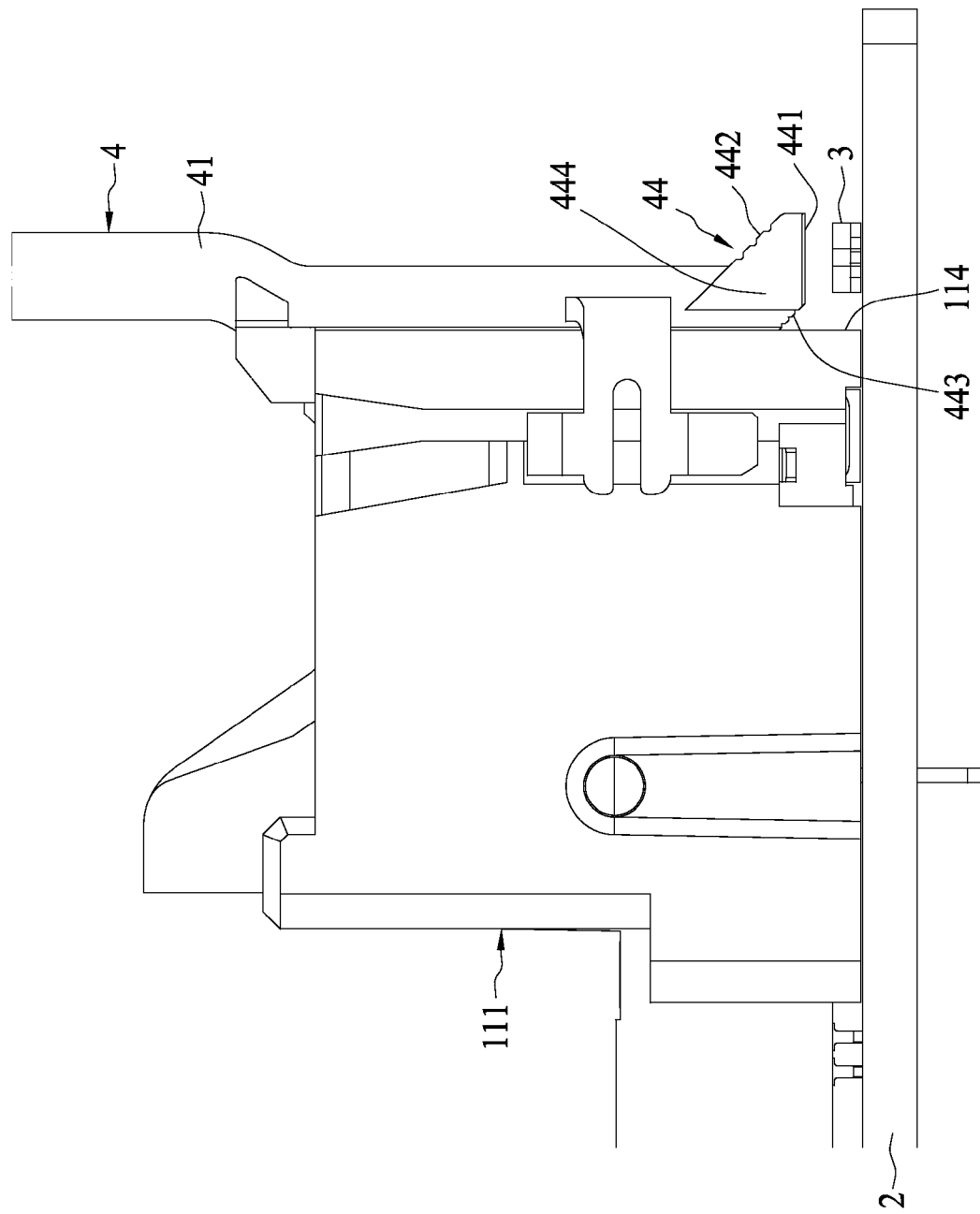
FIG. 12 is a side view showing an embodiment of a light pipe positioned to direct light from a status indicator.

Referring to FIG. 12, the status indicator 3 is placed beside the first end portion 111 and adjacent to the end wall 114. At the end, proximate to the status indicator 3, the main body 41 is disposed with a vertical reflector 44, which is configured for introducing light emitted upward from the status indicator 3 into the main body 41. As shown in FIG. 11, the vertical reflector 44, having a prism-like shape, includes a planar high gloss surface 441 horizontally laid over the status indicator 3. On the high gloss surface 441, a plurality of parallel cutting grooves can be formed. Behind the high gloss surface 441, a textured inclined surface 442 configured to reflect the light passing through the high gloss surface 441 is provided. On the textured inclined surface 442, a plurality of parallel cutting grooves can be formed to enhance reflectivity. Another textured inclined surface 443 configured to reflect the light reflected from the textured inclined surface 442 into the main body 41 is disposed below the main body 41 and parallel to the textured inclined surface 442. Similarly, a plurality of cutting grooves can be provided on the textured inclined surface 443. In addition to the two textured inclined surfaces 442 and 443, the side surfaces 444 of the vertical reflector 44 and the surface of the main body 41 close to the vertical reflector 44 are textured so as to increase light reflection efficiency.

Referring to FIG. 3, each main body 41 may have a plurality of bending portions 45 used for redirecting light transmitting within the main body 41. To more efficiently reflect light, the surfaces of the bending portions 45 can be textured. At the top end of each main body 41, a light indicator 47 is provided to allow technicians to observe the light of the corresponding status indicator 3.

Referring to FIGS. 3 and 4, the assembly of the light pipe 4 to the housing 11 is performed after the terminals 5 received within the housing 11 are soldered. Initially, both latch-ejector units 12 are moved to their close positions, and then each light pipe 4 is inserted downward with the guidance of the grooves 1152 to the locating ribs 4313 and 4314 until the locking parts 4311 and the protruding parts 4312 are disposed within the respective indented section 1151.

Figure 13:
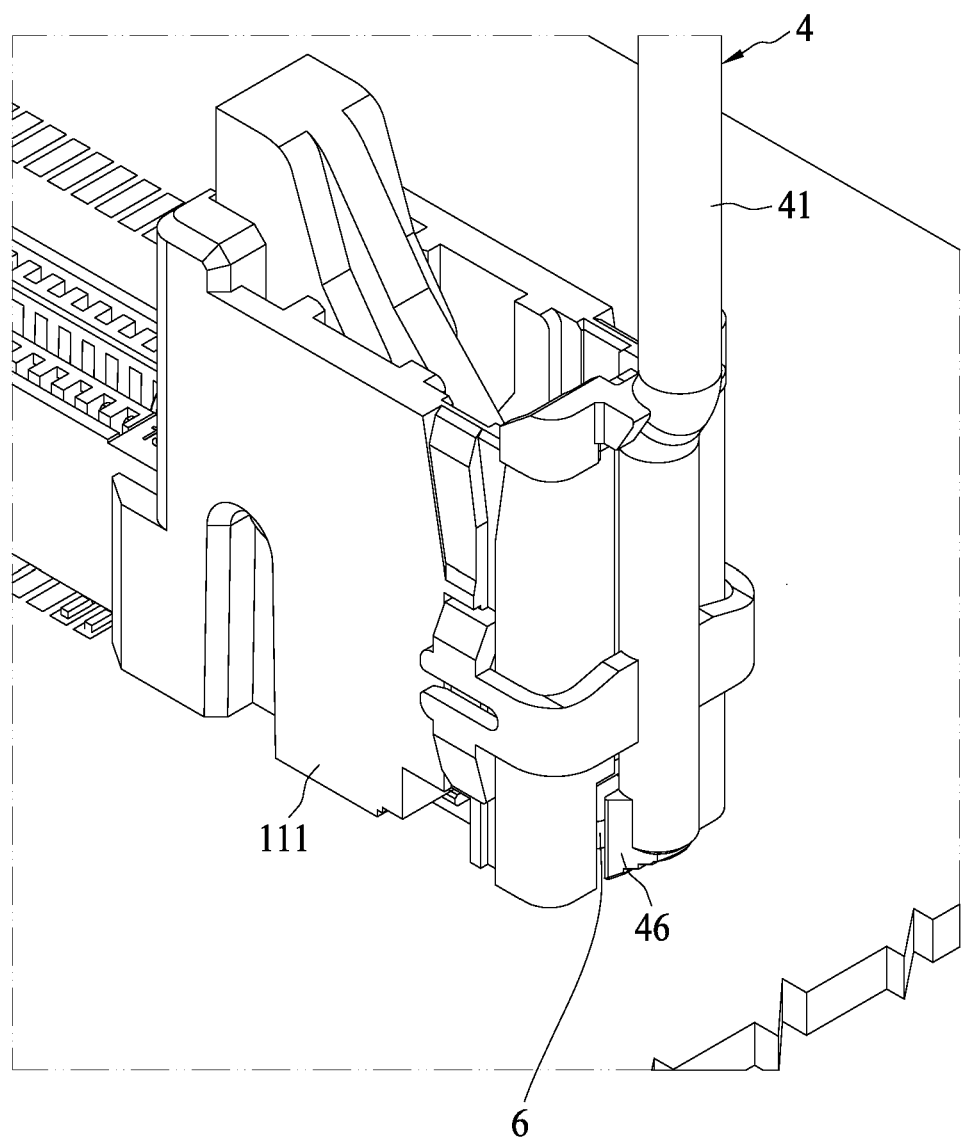
FIG. 13 is a perspective view showing another embodiment of a light pipe.
Figure 14:
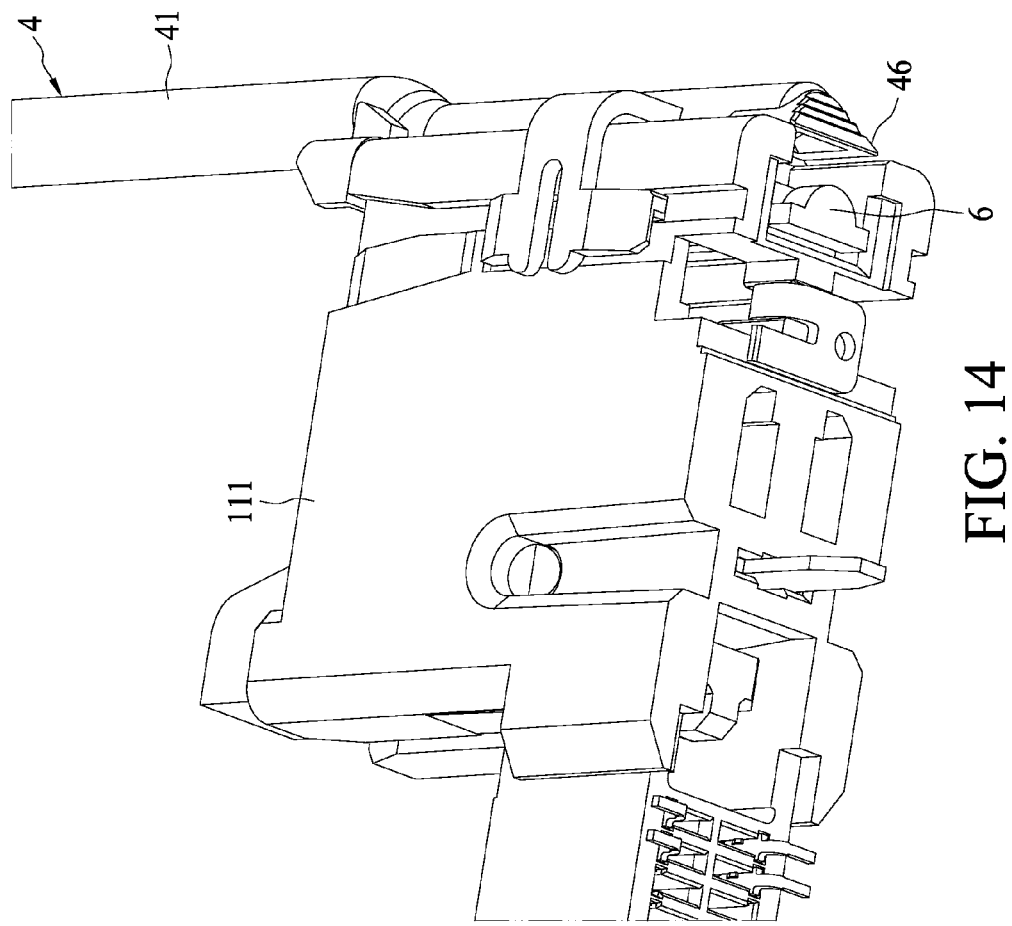
FIG. 14 is a perspective bottom view showing the light pipe depicted in FIG. 13.
Figure 15:
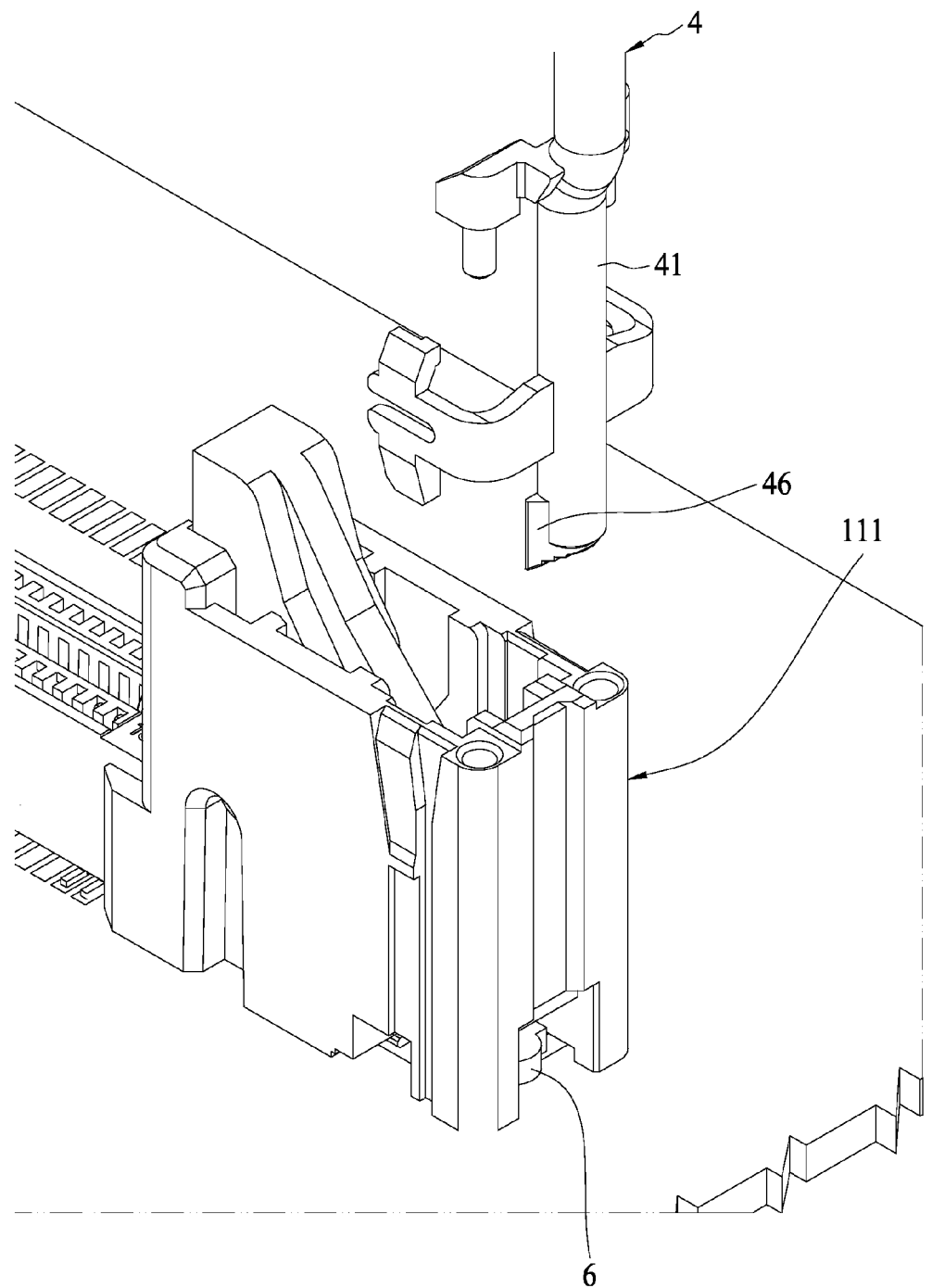
FIG. 15 a perspective view showing another embodiment of a light pipe with the light pipe separated from a housing.
Figure 16:
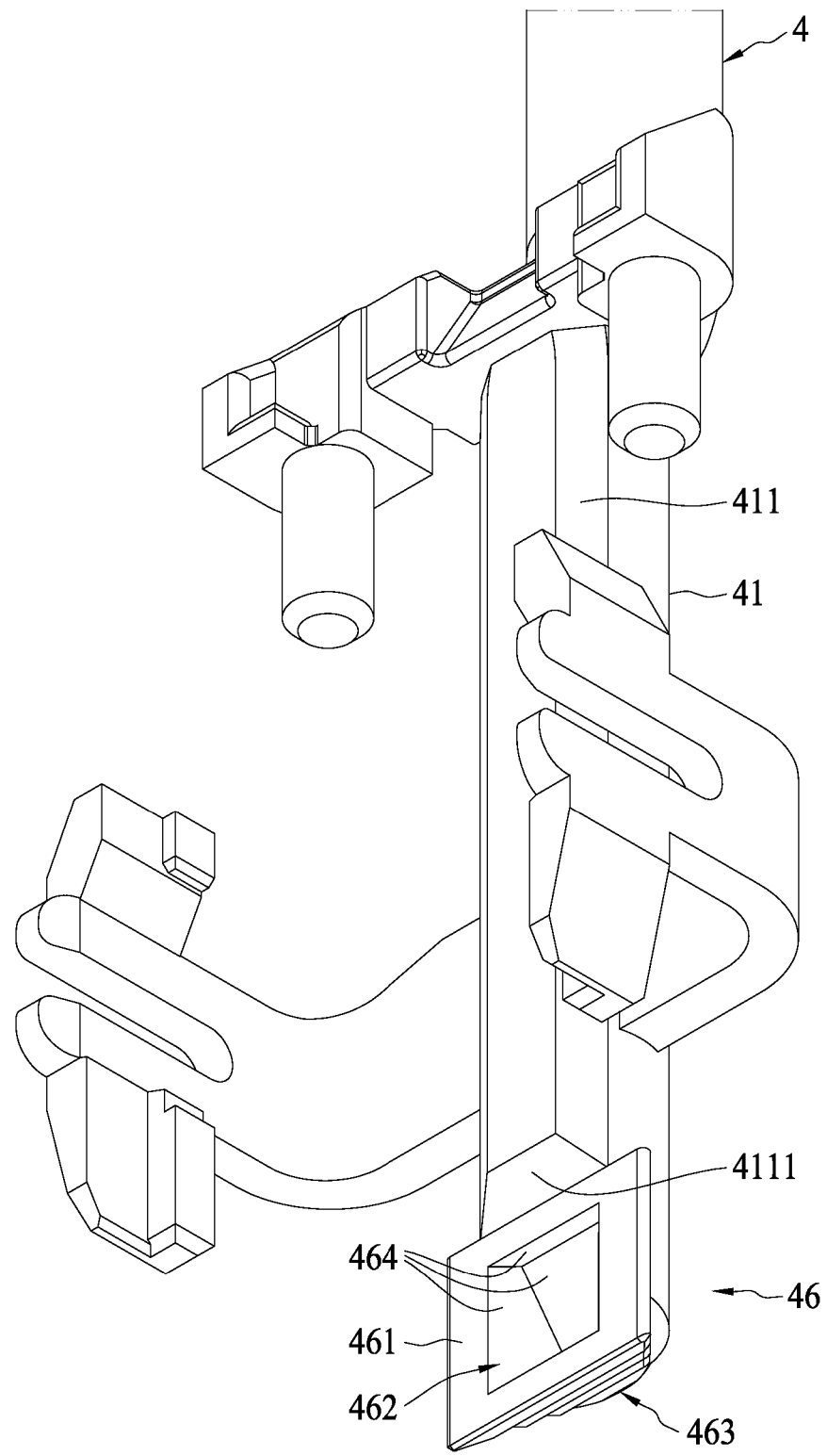
FIG. 16 is a partial perspective view of an embodiment of a light pipe such as could be used with the housing disclosed in FIG. 15.
Figure 17:
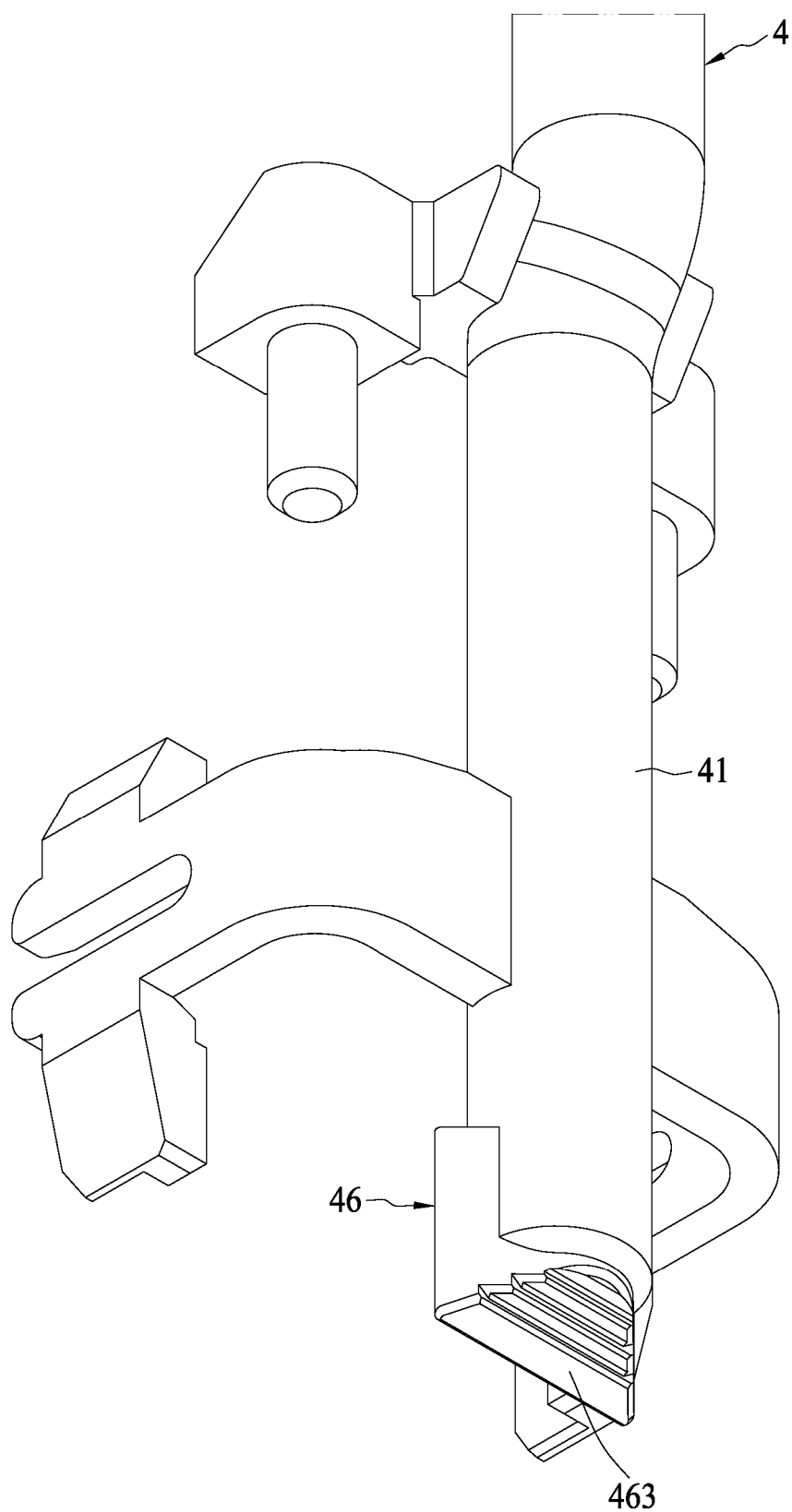
FIG. 17 is another partial perspective view showing the light pipe depicted in FIG. 16.
Figure 18:
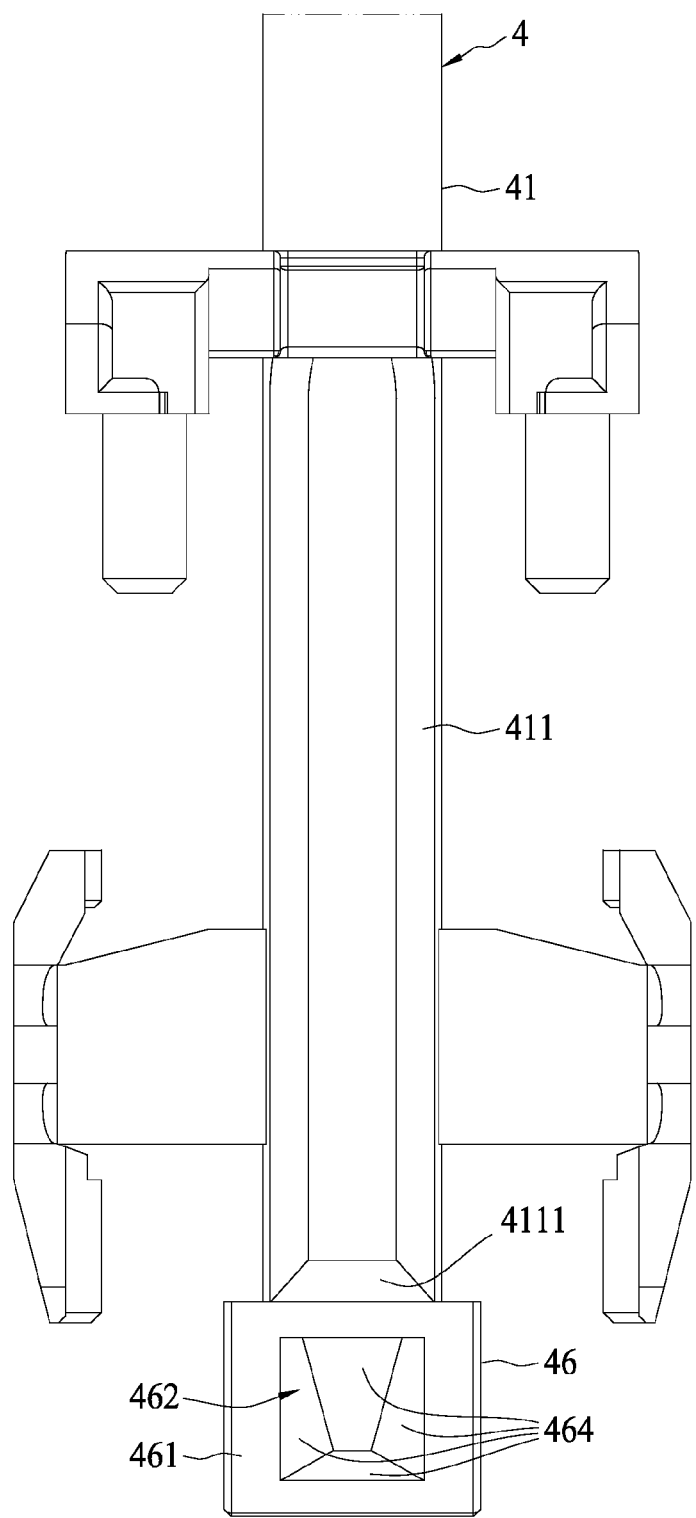
FIG. 18 is a partial front view of the light pipe depicted in FIG. 16.

Referring to FIGS. 13, 14 and 15, on densely populated printed circuit boards, there may be no extra space for the arrangement of status indicators. Under such situation, the status indicator 6 may be placed under the first end portion 111 as shown in FIGS. 14 and 15. To collect the light emitted laterally from the status indicator 6, a right-angle reflector 46 can be disposed on the end of the main body 41, close to the status indicator 6. Referring to FIGS. 16 to 18, the right-angle reflector 46 has a surface 461 facing the status indicator 6, and a cavity 462 is formed on the surface 461. The cavity 462 is defined by a plurality of inclined inner surfaces 464, which are all high gloss surfaces. The bottom surface 4111 of the received portion 411 is also a high gloss surface for increasing introduction of light. The bottom surface 463 of the right-angle reflector 46 is a textured inclined surface, on which a plurality of parallel cutting grooves can be formed to increase light reflectivity as shown in FIG. 17. The back side surfaces of the right-angle reflector 46 and a portion of the surface of the main body 41, adjacent to the right-angle reflector 46, can be textured surfaces such that the light reflectivity efficiency can be improved.

The above-described embodiments of the disclosure are intended to be illustrative only. Numerous alternative embodiments may be devised by persons skilled in the art without departing from the scope of the following claims.

What is claimed is:

1. An electrical connector comprising:
   a housing including first and second end portions, the housing configured for electrically and mechanically connecting a circuit board and including on the first end portion a recess in a first surface and a second and a third surface;
   a light pipe mounted on the first end portion, the light pipe including an elongated main body configured to receive light emitted from a status indicator and direct the light along the main body, the light pipe further including a support member mounted on a first surface of the housing and a clip member configured to engage a second and third surface of the housing;
   a pair of latch-ejector units mounted in a pivoting manner within the respective first and second end portions; and
   a pair of actuators configured to receive a force to move the respective latch-ejector units.

2. An electrical connector, comprising:
   a housing including first and second end portions, the housing configured for electrically and mechanically connecting a circuit board and including on the first end portion a recess in a first surface and a second and a third surface; and
   a light pipe mounted on the first end portion, the light pipe including an elongated main body configured to receive light emitted from a status indicator and direct the light along the main body, the light pipe further including a support member mounted on a first surface of the housing and a clip member configured to engage a second and third surface of the housing, wherein the main body comprises a plurality of bending portions, and surfaces of the bending portions are textured.

3. An electrical connector comprising:
a housing including first and second end portions, the housing configured for electrically and mechanically connecting a circuit board and including on the first end portion a recess in a first surface and a second and a third surface; and
a light pipe mounted on the first end portion, the light pipe including an elongated main body configured to receive light omitted from a status indicator and direct the light along the main body, the light pipe further including a support member mounted on a first surface of the housing and a clip member configured to engage a second and third surface of the housing, the support member including a supporting arm, wherein the supporting arm comprises a downwardly projected pin disposed close to the distal end of the supporting arm, and the first surface including recesses mated with the pin.

4. An electrical connector, comprising:
a housing including first and second end portions, the housing configured for electrically and mechanically connecting a circuit board and including on the first end portion a recess in a first surface and a second and a third surface; and
a light pipe mounted on the first end portion, the light pipe including an elongated main body configured to receive light emitted from a status indicator and direct the light along the main body, the light pipe further including a support member mounted on a first surface of the housing and a clip member configured to engage a second and third surface of the housing, wherein the support member comprises a pair of supporting arms engageable with the first surface of the first end portion; the supporting arms extending horizontally and generally away from one another.

5. The electrical connector of claim 4, wherein the second and third surface are on opposite sides of the housing and the clip member includes a pair of locking portions adapted to extend oppositely and laterally from the main body and to engage the second and third surface.

6. The electrical connector of claim 5, wherein the second and third surface include an indented section formed on the respective surface; and wherein each locking portion further comprises a locking part disposed with respect to the respective first indented section and each locking part projects inwardly to engage the respective indented section.

7. The electrical connector of claim 4, wherein the light pipe includes:
a high gloss surface configured to be positioned over a status indicator;
a first textured inclined surface placed behind the high gloss surface and configured to reflect light passing through the high gloss surface; and
a second textured inclined surface disposed in parallel with the first textured inclined surface and configured to reflect light reflected from the first textured inclined surface into the main body.

8. The electrical connector of claim 7, wherein the first textured inclined surface and the second textured inclined surface each includes a plurality of parallel cutting grooves.

9. The electrical connector of claim 7, wherein the main body of the light pipe includes a right-angle reflector configured to receive and direct laterally emitting light into the main body.

10. The electrical connector of claim 9, wherein the right-angle reflector includes:
a high gloss surface facing the status indicator and a cavity formed on the high gloss surface; and
a plurality of inclined inner surfaces defining the cavity, wherein the inclined inner surfaces are high gloss surfaces.

11. The electrical connector of claim 10, wherein back side surfaces of the right-angle reflector are textured.

12. The electrical connector of claim 11, wherein a bottom surface of the received portion is a high gloss surface.

13. An electrical connector comprising:
a housing including first and second end portions, the housing configured for electrically and mechanically connecting a circuit board and including on the first end portion a recess in a first surface and a second and a third surface; and
a light pipe mounted on the first end portion, the light pipe including an elongated main body configured to receive light emitted from a status indicator and direct the light along the main body, the light pipe further including a support member mounted on a first surface of the housing and a clip member configured to engage a second and third surface of the housing, wherein the second and third surface are on opposite sides of the housing and the clip member includes a pair of locking portions adapted to extend oppositely and laterally from the main body and to engage the second and third surface and wherein the second and third surface include an indented section formed on the respective surface and wherein each locking portion further comprises a locking part disposed with respect to the respective first indented section and each locking part projects inwardly to engage the respective indented section and wherein each of the second and third surface includes a groove and each locking part comprises a first locating rib positioned in the corresponding groove, the locking part configured to translate within the groove when the light pipe is mounted on the housing.

14. The electrical connector of claim 13, wherein each locking portion further comprises a protruding part disposed opposite and below the locking part; and each protruding part includes a second locating rib disposed in the groove and the clip member is configured to translate when the light pipe is mounted to the housing.

15. The electrical connector of claim 14, wherein the groove includes a lead-in part for conveniently inserting the respective first and second locating ribs.

16. The electrical connector of claim 15, wherein each surface includes a second indented section that tapers from the top of the first end portion toward the first indented section.

17. The electrical connector of claim 16, wherein the main body includes a received portion and the first end portion includes an end wall having a vertically disposed second groove for receiving the received portion.

18. The electrical connector of claim 17, wherein the distal end of each locking portion is formed with a slit.

19. The electrical connector of claim 18, wherein the status indicator is placed beside the first end portion; and the main body of the light pipe includes a vertical reflector disposed over the status indicator and configured to receive and reflectively direct light emitted from the status indicator into the main body.

* * * * *